United States Patent [19]

Schoefberger

[11] Patent Number: 5,354,849
[45] Date of Patent: Oct. 11, 1994

[54] SULFO GROUP-CONTAINING DISAZO COMPOUNDS CONTAINING SUBSTITUTED AMINO-1,3,5-TRIAZINIL OR-CHLOROPYRIMIDYL

[75] Inventor: Georg Schoefberger, Basel, Switzerland

[73] Assignee: Sandoz Ltd., Basel, Switzerland

[21] Appl. No.: 73,228

[22] Filed: Jun. 4, 1993

Related U.S. Application Data

[63] Continuation of Ser. No. 858,921, Mar. 27, 1992, abandoned.

[30] Foreign Application Priority Data

Mar. 30, 1991 [DE] Fed. Rep. of Germany ....... 4110461

[51] Int. Cl.$^5$ .............. C09B 62/03; C09B 62/09; D06P 1/382
[52] U.S. Cl. ................. 534/637; 534/632; 534/635; 534/649; 534/797
[58] Field of Search ........... 534/632, 635, 637, 797, 534/649

[56] References Cited

U.S. PATENT DOCUMENTS

| | | | |
|---|---|---|---|
| 3,843,624 | 10/1974 | Seiler et al. | 534/632 X |
| 4,145,340 | 3/1979 | Ridyard | 534/638 |
| 4,294,580 | 10/1981 | Henk et al. | 8/549 |
| 5,075,428 | 12/1991 | Jager | 534/637 |

FOREIGN PATENT DOCUMENTS

| | | | |
|---|---|---|---|
| 290384 | 11/1988 | European Pat. Off. | 534/797 |
| 356681 | 3/1990 | European Pat. Off. | |
| 62-84159 | 4/1987 | Japan | 534/637 |
| 1456001 | 11/1976 | United Kingdom | |

*Primary Examiner*—Robert W. Ramsuer
*Assistant Examiner*—Fiona T. Powers
*Attorney, Agent, or Firm*—Robert S. Honor; Melvyn M. Kassenoff

[57] ABSTRACT

Anionic disazo compounds of the formula

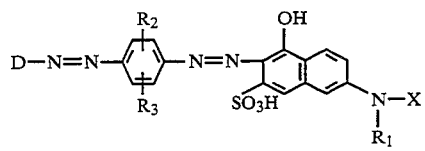

and salts thereof each cation of which is independently a non-chromophoric cation, and mixtures of such compounds or salts, wherein D is

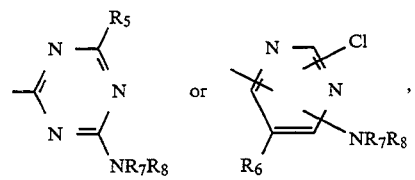

wherein
$R_4$ is hydrogen, $C_{1-4}$alkyl, $C_{1-4}$alkoxy or halo,
$R_1$ is hydrogen, $C_{1-4}$alkyl or $C_{2-4}$hydroxyalkyl,
$R_2$ is hydrogen, $C_{1-4}$alkyl, $C_{1-4}$alkoxy, ($C_{1-4}$alkyl)carbonylamino, ($C_{1-4}$alkoxy)carbonylamino or —NHCONH$_2$,
$R_3$ is hydrogen, halo, $C_{1-4}$alkyl or $C_{1-4}$alkoxy, and
X is

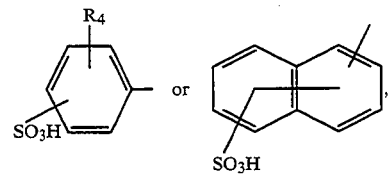

wherein
$R_5$ is chloro, hydroxy or —NHCN,
$R_6$ is hydrogen, chloro or cyano, and
$R_7$ and $R_8$ are as defined in the specification, with the proviso that $R_7$ and $R_8$ together contain at least 8 carbon atoms, useful for dyeing or printing anionically dyeable organic substrates such as nitrogen-containing substrates, particularly fiber material comprising natural or synthetic polyamide.

22 Claims, No Drawings

SULFO GROUP-CONTAINING DISAZO COMPOUNDS CONTAINING SUBSTITUTED AMINO-1,3,5-TRIAZINIL OR-CHLOROPYRIMIDYL

This is a continuation of application Ser. No. 07/858,921, filed Mar. 27, 1992, and now abandoned.

This invention relates to sulpho group-containing disazo compounds and a process for their preparation which compounds are useful as anionic dyestuffs, especially for dyeing or printing natural or synthetic polyamides.

More particularly, the invention provides compounds of formula I,

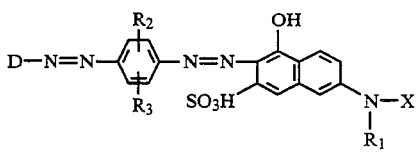

and salts thereof, in which
D is

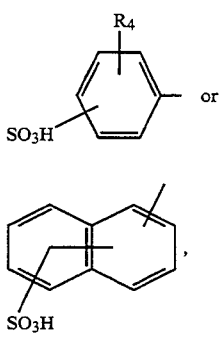

$R_4$ is hydrogen, $C_{1-4}$alkyl, $C_{1-4}$alkoxy or halogen,
$R_2$ is hydrogen, $C_{1-4}$alkyl, $C_{1-4}$alkoxy, —NHCOC$_{1-4}$alkyl, —NHCOOC$_{1-4}$alkyl or —NHCONH$_2$,
$R_3$ is hydrogen, halogen, $C_{1-4}$alkyl or $C_{1-4}$alkoxy,
$R_1$ is hydrogen, $C_{1-4}$alkyl or $C_{1-4}$hydroxyalkyl,
X is a radical (c) or (d),

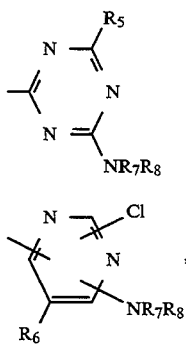

$R_5$ is chlorine, hydroxy or —NHCN,
$R_6$ is hydrogen, chlorine or cyano,
$R_7$ is hydrogen; $C_{1-12}$alkyl; $C_{2-8}$alkyl monosubstituted or disubstituted by hydroxy; phenyl; phenyl($C_{1-4}$alkyl) or cyclohexyl; and
$R_8$ is $C_{4-20}$alkyl; $C_{4-20}$alkyl substituted by one or two hydroxy groups or monosubstituted by halogen, phenyl, carboxy or $C_{1-12}$alkoxy; —A—O—$C_{1-12}$alkyl in which A is $C_{2-3}$alkylene; phenyl; phenyl substituted by one to three substituents selected from halogen, $C_{1-16}$alkyl, $C_{2-6}$hydroxyalkyl, $C_{1-6}$alkoxy, phenoxy and —NHCOCH$_3$; phenyl($C_{1-3}$alkyl); phenyl($C_{1-3}$alkyl) the phenyl ring of which is substituted by one to three substituents selected from halogen, $C_{1-16}$alkyl, $C_{2-6}$hydroxyalkyl, $C_{1-6}$alkoxy, phenoxy and —NHCOCH$_3$; cyclohexyl or cyclohexyl substituted by one to three $C_{1-4}$alkyl groups; with the proviso that the total number of carbon atoms present in $R_7$ and $R_8$ together is at least 8; or
—NR$_7$R$_8$ is

and mixtures of compounds and salts of formula I.

Any alkyl, alkoxy or alkylene group present in the specification is linear or branched unless indicated otherwise.

In any hydroxy- or alkoxy-substituted alkyl or alkylene group which is bound to a nitrogen atom, the hydroxy or alkoxy group is preferably bound to a carbon atom which is not directly attached to the nitrogen atom. Preferably, in any alkyl group substituted by two hydroxy groups, the hydroxy groups are bound to different carbon atoms which are preferably not adjacent to each other.

Any halogen is preferably fluorine, chlorine or bromine and especially chlorine.

In the radical of formula (b)

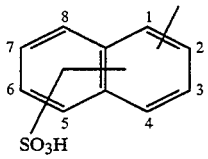

the position of the sulpho group dependent on the position of the azo group is preferably as follows:

(i) the azo group is in the 1-position: the sulpho group is preferably in the 4-, 5-, 6-, 7- or 8-position, particularly in the 4-, 5-, 6- or 7-position;

(ii) the azo group is in the 2-position: the sulpho group is preferably in the 5-, 6-, 7- or 8-position, particularly in the 5- or 6-position.

D is preferably a radical (a).

D is preferably $D_1$, where $D_1$ is a radical ($a_1$) of the formula

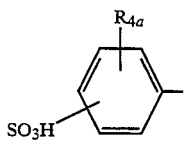

in which $R_{4a}$ is hydrogen, chlorine, methyl or methoxy.

More preferably, D is $D_2$, where $D_2$ is a radical ($a_2$) of the formula

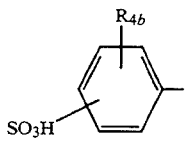

in which $R_{4b}$ is hydrogen or methyl.

Even more preferably, D is $D_3$, where $D_3$ is a radical $(a_3)$ of the formula

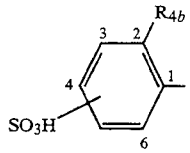

in which the sulpho group is in the 4- or 5-position and $R_{4b}$ is as defined above.

Most preferably, D is $D_4$, where $D_4$ is a radical $(a_3)$ in which the sulpho group is in the 4-position and $R_{4b}$ is hydrogen.

$R_2$ and $R_3$ as substituents of the phenylenic middle component are preferably para to each other as shown in the following formula:

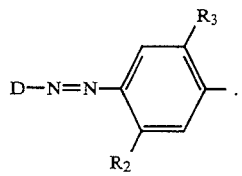

$R_2$ is preferably $R_{2a}$, where $R_{2a}$ is hydrogen, methyl, methoxy, —NHCOCH$_3$, —NHCOOC$_{1\text{-}2}$alkyl or —NHCONH$_2$. More preferably it is $R_{2b}$, where $R_{2b}$ is hydrogen, methyl, —NHCOCH$_3$ or —NHCONH$_2$. Most preferably it is $R_{2c}$, where $R_{2c}$ is hydrogen or methyl, with hydrogen being especially preferred.

$R_3$ is preferably $R_{3a}$, where $R_{3a}$ is hydrogen, methyl or methoxy. Most preferably $R_3$ is hydrogen.

$R_1$ is preferably $R_{1a}$, where $R_{1a}$ is hydrogen, C$_{1\text{-}2}$alkyl or 2-hydroxyethyl. More preferably $R_1$ is $R_{1b}$, where $R_{1b}$ is hydrogen or methyl. Most preferably $R_1$ is hydrogen.

$R_7$ is preferably $R_{7a}$, where $R_{7a}$ is hydrogen; C$_{1\text{-}4}$alkyl; C$_{2\text{-}4}$alkyl substituted by one or two hydroxy groups; or phenyl. More preferably it is $R_{7b}$, where $R_{7b}$ is hydrogen; methyl; C$_{2\text{-}4}$alkyl substituted by one or two hydroxy groups; or phenyl. Even more preferably it is $R_{7c}$, where $R_{7c}$ is hydrogen, methyl, C$_{2\text{-}4}$alkyl monosubstituted by hydroxy in other than the 1-position or C$_{3\text{-}4}$alkyl disubstituted by hydroxy, with the proviso that neither hydroxy group is in the 1-position and the two hydroxy groups are not attached to the same or adjacent carbon atoms. Most preferably $R_7$ is hydrogen.

Preferably, $R_8$ is $R_{8a}$, where $R_{8a}$ is C$_{4\text{-}14}$alkyl; C$_{4\text{-}14}$alkyl monosubstituted by phenyl; —A$_1$—O—C$_{6\text{-}12}$alkyl in which A$_1$ is linear C$_{2\text{-}3}$alkylene; phenyl substituted by two or three C$_{1\text{-}2}$alkyl groups or monosubstituted by C$_{6\text{-}16}$alkyl or phenoxy; phenyl(C$_{1\text{-}2}$alkyl); phenyl(C$_{1\text{-}2}$alkyl) in which the phenyl ring is monosubstituted by C$_{6\text{-}14}$alkyl; or cyclohexyl substituted by one to three methyl groups.

More preferably, $R_8$ is $R_{8b}$, where $R_{8b}$ is C$_{8\text{-}14}$alkyl; phenyl monosubstituted by C$_{8\text{-}14}$alkyl or phenoxy or substituted by three C$_{1\text{-}2}$alkyl groups; or cyclohexyl substituted by one to three methyl groups.

Most preferably, $R_8$ is $R_{8c}$, where $R_{8c}$ is C$_{10\text{-}14}$alkyl or phenyl monosubstituted by C$_{10\text{-}14}$alkyl or phenoxy.

X is preferably $X_1$, where $X_1$ is a radical $(c_1)$ or $(d_1)$,

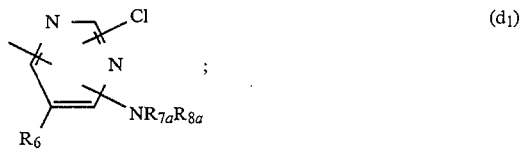

more preferably it is $X_2$, where $X_2$ is a radical $(c_2)$,

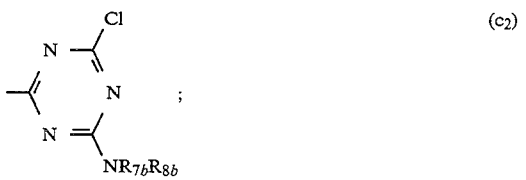

most preferably X is $X_3$, where $X_3$ is a radical $(c_3)$,

in which $R_{7c}$ especially is hydrogen.

Representative compounds of Formula I are those wherein $R_6$ is chloro or cyano, and $R_8$ is C$_{4\text{-}20}$alkyl; C$_{4\text{-}20}$alkyl monosubstituted or disubstituted by hydroxy; C$_{4\text{-}20}$alkoxy; —A—O—C$_{2\text{-}12}$alkyl; phenyl; phenyl substituted by one to three substituents selected from halo, C$_{1\text{-}14}$alkyl, C$_{2\text{-}6}$hydroxyalkyl, C$_{1\text{-}6}$alkoxy, phenoxy and acetamido; phenyl(C$_{1\text{-}3}$alkyl); phenyl(C$_{1\text{-}3}$alkyl) the phenyl ring of which is substituted by one to three substituents selected from halo, C$_{1\text{-}14}$alkyl, C$_{2\text{-}6}$hydroxyalkyl, C$_{1\text{-}6}$alkoxy, phenoxy and acetamido; cyclohexyl or cyclohexyl substituted by one to three C$_{1\text{-}4}$alkyl groups.

Preferred compounds of formula I correspond to formula Ia,

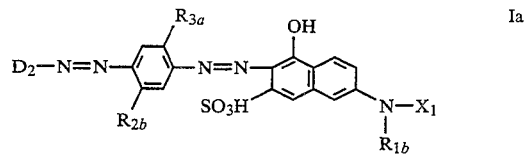

and salts and mixtures thereof in which $R_{1b}$, $R_{2b}$, $R_{3a}$, $D_2$ and $X_1$ are as defined above, with the proviso that the total number of carbon atoms present in $R_{7a}$ and $R_{5a}$ of $X_1$ together is at least 8.

More preferred are compounds of formula Ia in which
(1) $D_2$ is $D_3$;
(2) $D_2$ is $D_4$;
(3) $R_{2b}$ is $R_{2c}$;
(4) those of (3) in which $R_{2c}$ and $R_{3a}$ are both hydrogen;
(5) $X_1$ is $X_2$;
(6) $X_1$ is $X_3$;
(7) $R_{1b}$ is hydrogen;
(8) those of (1) to (6) wherein $R_{1b}$ is hydrogen;
(9) those of (6) wherein $R_{1b}$ and $R_{7c}$ are both hydrogen;
(10) those of (6) wherein $R_{1b}$, $R_{2b}$ and $R_{3a}$ are all hydrogen.

When a compound of formula I is in salt form, the cation associated with the sulpho groups and any carboxy group is not critical and may be any one of those non-chromophoric cations conventional in the field of anionic dyes. Examples of such cations are alkali metal cations and unsubstituted and substituted ammonium cations, e.g., lithium, sodium, potassium, ammonium, mono-, di-, tri- and tetra-methylammonium, triethylammonium and mono-, di- and tri-ethanolammonium.

The preferred cations are the alkali metal cations and ammonium, with sodium being the most preferred.

In a compound of formula I the cations of the sulpho and any carboxy groups can be the same or different, e.g., they can also be a mixture of the above mentioned cations meaning that the compound of formula I can be in a mixed salt form.

The invention further provides a process for the preparation of compounds of formula I and mixtures thereof comprising reacting the following components in which the symbols are as defined above:

a compound of formula IIc or IId,

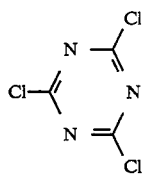

IIc

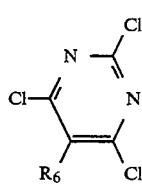

IId the diazonium salt of an amine of formula III,

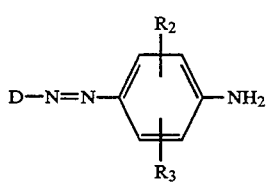

III a compound of formula IV,

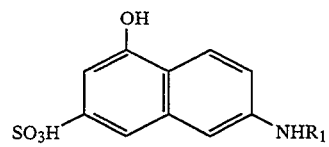

IV in free acid or salt form,
an amine of formula V, $NHR_7R_8$      V in any desired order using equimolar amounts of each single component by coupling in a neutral to weakly alkaline reaction medium and corresponding condensation reactions, whereby at any stage in the reaction course optionally reacting with a base or cyanamide in order to introduce a group $R_5$ when other than chlorine.

Diazotisation and coupling reactions may be carried out in analogy with known methods. The exchange of each single chlorine atom present in a compound of formula IIc or IId is suitably effected under such conditions relating to pH and temperature which are conventional with respect to the exchange of the first, second and optionally third chlorine atom of trichloro-triazine or -pyrimidine.

The compounds of formula I may be isolated in accordance with known methods, for example, by conventional salting out with alkali metal salt, filtering and drying.

Depending on the reaction and isolation conditions a compound of formula I is obtained in free acid or preferably salt form or even mixed salt form containing, for example, one or more of the above-mentioned cations. It may be converted from free acid form to a salt form or mixture of salt forms or vice versa or from one salt form to another by conventional means.

The compounds of formulae IIc, IId and III to V used as starting compounds are either known or may be prepared in analogy with known methods using appropriate known starting compounds.

The compounds of formula I are anionic dyestuffs which are useful for dyeing or printing anionically dyeable organic substrates. Suitable substrates are nitrogen-containing substrates, particularly those containing amido groups, such as leather or fibre material comprising basic modified polyolefins, polyurethanes or natural or synthetic polyamides of which textiles comprising natural or synthetic polyamides are preferred, particularly wool, silk, polyamide 6, polyamide 6.6, polyamide 11, polyamide 46 or Qiana ® (a polyamide fibre which may be obtained by reacting 4,4'-methylene-bis(cyclohexylamine) with a $C_{12}$ dicarboxylic acid, and available commercially from Du Pont) and mixtures with each other or with other fibres. These substrates may be used in any form usually employed for dyeing from an aqueous medium, e.g., as loose fibres, yarns, threads, filaments, hanks, spools, fabrics, texture, felts, fleeces, velvet, carpets, tufting ware, and semifinished or fully fashioned goods.

The above-mentioned substrates may be dyed according to conventional dyeing methods, for example in accordance with exhaust dyeing from an aqueous dye liquor or by impregnating with an aqueous dye liquor or a dye preparation.

The dyestuffs may be employed in the appropriate commercial dry or liquid forms, e.g., as powder, granules or liquid dyeing preparations. They may contain suitable standardising agents such as water-soluble salts (particularly sodium chloride, sodium carbonate and sodium sulphate), non-electrolyte type of standardising agents such as dextrin and urea, and optionally further additives which are suitable for the formulation of solid or liquid preparations. If dyestuffs which are especially low in electrolytes are required, these may be obtained by purification in accordance with known osmotic methods.

Any aqueous liquid dyeing preparations may contain further additives such as non-ionic and/or anionic surfactants, e.g. hydrocarbon sulphonates or lignin sulphonates; furthermore hydrotropic agents and/or non-ionic solubilising agents, for example urea or mono- or oligo-ethylene glycols and mono-$C_{1-6}$alkyl ethers thereof.

Any granules may contain granulating auxiliaries, artionic or non-ionic surfactants and/or hydrotropic agents, e.g., urea or dextrin.

Preferably, the dyeing preparations contain at least 5% by weight, more preferably 10 to 90% by weight, of a compound of formula I which depends on the form and composition of the preparation; powder and granules for example contain 20 to 90% by weight, whereas liquid dyeing preparations contain 10 to 40% by weight. Most convenient is the use of the above defined dyestuffs in powder form optionally containing any standardising agents.

Exhaust dyeing may be effected in accordance with conventional conditions, for example at a temperature range of from 40° to 120° C. and at a pH range of from 3.5 to 10, preferably at pH 4 to 7. The pH of the dyebath may be adjusted by adding acids usually employed such as formic acid, acetic acid, tartaric acid or citric acid, or a buffer solution such as a phosphate, tartrate or acetate buffer. The case of pH-controlled dyeing processes, the process can be started at pH 9–10 and subsequently, in the course of the dyeing process, the pH may be lowered to a pH up to 3.5 to 4.5. Since the compounds of formula I have neutral dyeing properties for dyeing of synthetic polyamides, the pH of the dyebath is preferably adjusted to a weakly acid to neutral reaction, and is more preferably held at pH 4.5–6. Regarding dyeing of wool a lower pH is preferred, more particularly in the range of pH 4–5.5.

Using an impregnation process, any conventional method is suitable, whereby the substrate is impregnated by an aqueous dye liquor or paste, for example by a dipping, padding or printing process. Subsequently, the dyeing obtained is fixed in accordance with conventional means, e.g., by the cold dwell method suitably at temperatures of 15°–40° C., preferably at 20°–30° C., or by steaming for example at 85°–105° C.

For dyeing synthetic as well as natural polyamides, advantageously, a levelling agent is used which retards the rate of absorption to a small extent whereby yielding a good levelness of the whole dyeing surface, even with respect to lighter dyeings.

The compounds of formula I show good water-solubility and good neutral dyeing affinity together with good build-up. Particularly when a levelling agent is present, they dye nylon which tends to give skittery dyeings evenly. The dyeings obtained with a compound of formula I or a mixture thereof show high brilliance and good light fastness. Furthermore, the dyeings exhibit notably good wet fastness properties, particularly with respect to washing, water, milling and sweat fastness.

The invention is further illustrated with reference to the following non-limiting examples, in which all parts are expressed by weight unless otherwise stated and all temperatures are in degrees Centigrade.

EXAMPLE 1

18.5 Parts of 2,4,6-trichloro-1,3,5-triazine are stirred into 50 parts of water and 50 parts of ice to yield a fine and homogeneous suspension. To this suspension, a neutral (pH=7) solution consisting of 52.7 parts of an aminodisazo compound which is obtained by coupling in a neutral reaction medium diazotised 4-amino-1,1′-azobenzene-4′-sulphonic acid with 2-amino-5-hydroxynaphthalene-7-sulphonic acid, and 500 parts of water is added dropwise at 0°–5° within two hours. During the addition, the pH of the reaction mixture is maintained at 5–6 by adding solid sodium carbonate. After the reaction is complete, a solution of 18.5 parts of dodecylamine and 50 parts of ethylene glycol is added to the mixture which is heated to 50° and stirred for three hours at this temperature. During this time the pH is kept at 9–9.5 by the addition of 150 parts of a 10% by weight sodium carbonate solution. After the reaction has been completed, the mixture is heated to 80°, and to the dyestuff suspension 50 parts of a 30% by weight sodium hydroxide solution and 100 parts of sodium chloride are added. The resulting precipitate is then filtered and dried. The dyestuff having the formula

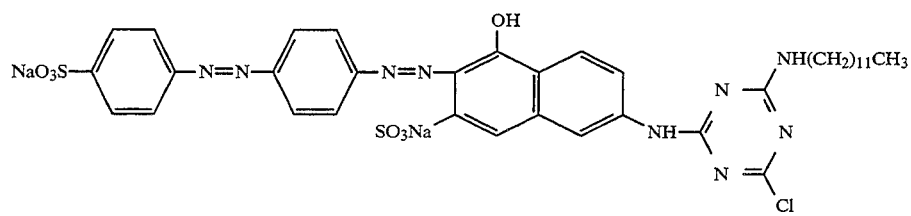

is obtained. It dyes synthetic polyamide or wool a brilliant red shade. The dyeings obtained show good wet fastness properties.

EXAMPLE 2

27.7 Parts of 4-amino-1,1′-azobenzene-4′-sulphonic acid are dissolved at 50° in 750 parts of water and 15 parts of a 30% by weight sodium hydroxide solution. Subsequently, 7 parts of sodium nitrite are added. The resulting solution is added to a mixture of 30 parts of a 30% by weight hydrochloric acid solution and 100 parts of water within 30 minutes. After having been stirred for four hours, diazotisation is complete. The excess nitrous acid is decomposed by adding sulphamic acid.

49.2 Parts of the sodium salt of 2-chloro-4-(5′-hydroxy-7′-sulphonaphthyl-2′-amino)-6-(3″,5″,5″-trimethylcyclohexylamino)-1,3,5-triazine are dissolved in 200 parts of water. To this solution 12 parts of sodium bicarbonate are added and subsequently the diazo suspension as prepared above. The mixture is then stirred until coupling is complete. Then 100 parts of sodium chloride are added, and the mixture is stirred overnight. The dyestuff which has been precipitated is filtered and dried. It has the formula tained as sodium salts, correspond for Table 1 to the formula

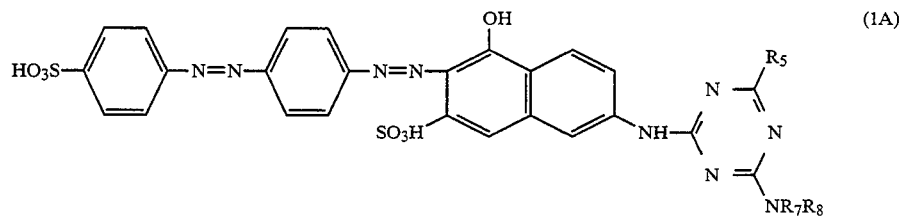

(1A)

and for Table 2 to the formula

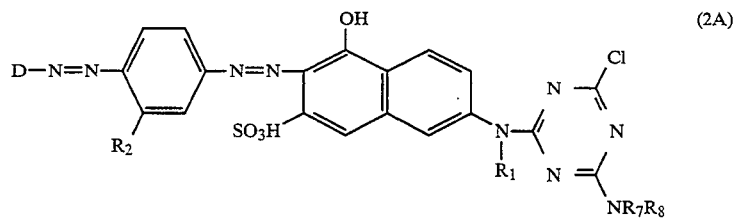

(2A)

in which the symbols are as defined in the tables.

With the compounds of Examples 3 to 59 red dyeings on wool or synthetic polyamide are obtained which show good wet fastness properties.

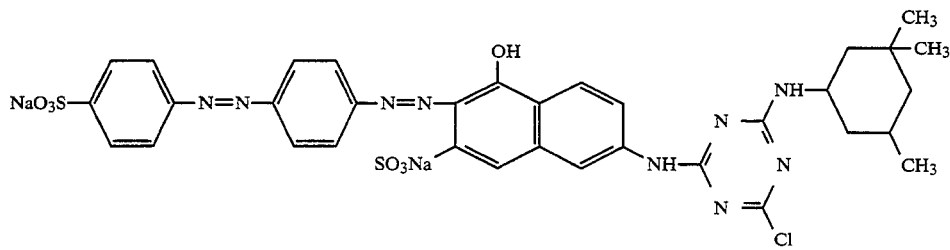

and dyes wool or synthetic polyamide a brilliant red shade. These dyeings show good wet fastness properties.

The coupling component used in Example 2 may be prepared as follows:

18.5 Parts of 2,4,6-trichloro-1,3,5-triazine are stirred into 50 parts of water and 50 parts of ice to yield a fine and homogeneous suspension. To this suspension a solution of 24 parts of 2-amino-5-hydroxynaphthalene-7-sulphonic acid, 200 parts of water and 15 parts of a 30% by weight sodium hydroxide solution is added within one hour. The reaction mixture is stirred for three hours at 0°–5° whilst the pH is kept at 2.0–2.5 by adding dropwise a 15% by weight sodium carbonate solution. As soon as the pH remains constant, 14 parts of 3,5,5-trimethylcyclohexylamine are added to the mixture which is heated to 55° and kept at this temperature for three hours. Simultaneously, 45 parts of a 10% by weight sodium hydroxide solution are added dropwise at such a rate that the pH of the mixture remains 7–7.5. Finally the reaction product is precipitated by adding sodium chloride and filtered.

EXAMPLES 3 TO 59

By analogy with the method described in Example 1 or 2, using appropriate starting compounds further compounds of formula I may be prepared which are listed in the following Tables 1 and 2. These dyestuffs which dependent on the isolation conditions are ob-

TABLE 1

Compounds of Formula (1A)

| Ex. No. | $R_5$ | $-NR_7R_8$ |
|---|---|---|
| 3 | Cl | $-NHCH_2\underset{\underset{C_2H_5}{\mid}}{C}H(CH_2)_3CH_3$ |
| 4 | Cl | $-NH(CH_2)_7CH_3$ |
| 5 | Cl | $-NH(CH_2)_9CH_3$ |
| 6 | Cl | $-NHCCH_2C(CH_3)_3$ with $CH_3$ groups |
| 7 | Cl | $-N(\underline{n}\text{-}C_4H_9)_2$ |
| 8 | Cl | $-N(\underline{n}\text{-}C_6H_{13})_2$ |
| 9 | Cl | $-N(\underline{n}\text{-}C_8H_{17})_2$ |
| 10 | Cl | $-N\big(\text{pyrrolidine-like bicyclic}\big)$ |
| 11 | Cl | $-NH\text{-}\phi\text{-}(CH_2)_3CH_3$ |

TABLE 1-continued

Compounds of Formula (1A)

| Ex. No. | R5 | —NR7R8 |
|---|---|---|
| 12 | Cl | —NH—C6H4—C12H25 |
| 13 | Cl | —NH—(2,6-dimethylphenyl) |
| 14 | OH | —NH(CH2)11CH3 |
| 15 | Cl | —NH(CH2)11COOH |
| 16 | Cl | —NH—C6H4—O—C6H5 |
| 17 | Cl | —NH—C6H4—NHCOCH3 (3-position) |
| 18 | Cl | —NH(CH2)13CH3 |
| 19 | Cl | —NH—(2,6-diethyl-4-methylphenyl) |
| 20 | Cl | —NH(CH2)3O-n-C9H19 |
| 21 | OH | —NH(CH2)9CH3 |
| 22 | OH | —NH—C6H4—(CH2)3CH3 |
| 23 | OH | —NH—C6H4—C12H25 |
| 24 | OH | —NH(CH2)3O-n-C9H19 |
| 25 | Cl | —NH—C6H4—C(CH3)3 |
| 26 | Cl | —N(C6H5)(CH2)3CH3 |
| 27 | Cl | —NH(CH2)17CH3 |
| 28 | Cl | —N(CH3)(CH2)11CH3 |
| 29 | Cl | —N(C6H5)(CH2C6H5) |
| 30 | Cl | —NH(CH2)8CH3 |
| 31 | Cl | —NH(CH2)10CH3 |
| 32 | Cl | —N[(CH2)9CH3][CH2CH(OH)CH2OH] |
| 33 | Cl | —NHCH[CH2CH(CH3)2][(CH2)2C6H5] |
| 34 | —NHCN | —NH(CH2)11CH3 |

TABLE 2

Compounds of Formula (2A)

| Ex. No. | D | R1 | R2 | —NR7R8 |
|---|---|---|---|---|
| 35 | C6H4—SO3H (3-position) | H | H | —NH(CH2)11CH3 |
| 36 | " | H | CH3 | " |
| 37 | " | H | " | —NH—C6H4—C12H25 |
| 38 | " | H | H | —NH(CH2)9CH3 |

TABLE 2-continued

Compounds of Formula (2A)

| Ex. No. | D | R₁ | R₂ | —NR₇R₈ |
|---|---|---|---|---|
| 39 | 4-HO₃S-C₆H₄— | H | CH₃ | —NH(CH₂)₁₁CH₃ |
| 40 | " | CH₃ | H | " |
| 41 | " | " | H | —NH—C₆H₄—C₁₂H₂₅ |
| 42 | 3-methyl-4-HO₃S-C₆H₃— (with CH₃ and HO₃S substituents) | H | H | " |
| 43 | " | H | H | —NH—C₆H₄—(CH₂)₃CH₃ |
| 44 | " | H | H | —NH(CH₂)₁₁CH₃ |
| 45 | 2-methyl-HO₃S-C₆H₃— | H | H | " |
| 46 | " | H | CH₃ | " |
| 47 | " | H | H | —NH(CH₂)₉CH₃ |
| 48 | " | H | H | —NH—C₆H₄—C₁₂H₂₅ |
| 49 | 3-methyl-4-SO₃H-C₆H₃— | H | H | " |
| 50 | 3-methyl-4-SO₃H-C₆H₃— | H | CH₃ | —NH—C₆H₄—C₁₂H₂₅ |
| 51 | " | H | H | —NH(CH₂)₁₁CH₃ |
| 52 | 6-SO₃H-naphth-2-yl | H | H | " |
| 53 | " | CH₃ | CH₃ | " |
| 54 | " | H | H | —NH—C₆H₄—C₁₂H₂₅ |

TABLE 2-continued

| Ex. No. | D | R₁ | R₂ | —NR₇R₈ |
|---|---|---|---|---|
| 55 | ![SO3H phenyl] | H | H | " |
| 56 | " | CH₃ | H | —NH—C₆H₄—(CH₂)₃CH₃ |
| 57 | " | H | H | " |
| 58 | " | CH₃ | H | —NH(CH₂)₁₁CH₃ |
| 59 | " | H | H | " |

It is noted that the amine of the formula

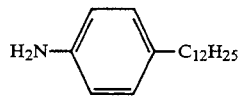

used for the preparation of a compound of Examples 12, 23, 37, 41, 42, 48–50, 54 and 55 is a commercially available product, the alkyl group of which is a mixture of linear and isomeric branched $C_{12}$alkyl groups.

EXAMPLES 60 TO 62

By analogy with the method described in Example 1 or 2, the dyestuffs having the formula

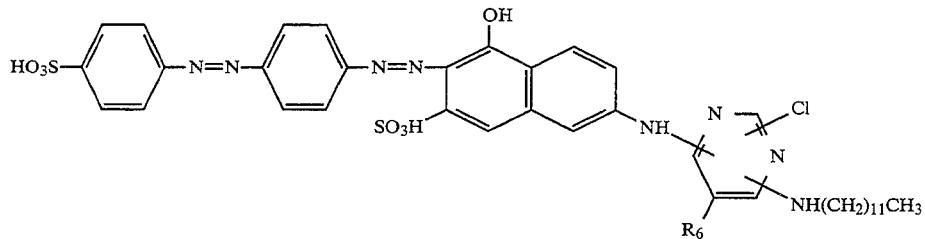

may also be prepared in which
for Example 60, $R_6$ is Cl;
for Example 61, $R_6$ is CN; and
for Example 62, $R_6$ is H.

The compounds of Examples 60 to 62 dye wool or synthetic polyamide in red shades. These dyeings exhibit good wet fastness properties.

The compounds of Examples 60 to 62 are obtained in form of a mixture of position isomers with respect to the pyrimidine radical in which the floating substituents may be bound to different carbon atoms regarding the nitrogen atoms of the pyrimidinyl radical. These isomeric mixtures may be used in conventional dyeing or printing processes; the isolation of a single isomer for use normally is unnecessary.

By the preparation methods described in the preceding examples, the compounds of Examples 1 to 62 are obtained in their sodium salt form. By changing the reaction or isolation conditions or by using other known methods, it is possible to produce the compounds in the form of free acid or in other salt forms or mixed salt forms which contain one or more of the cations mentioned hereinabove.

In the following examples, the application of the compounds of this invention is illustrated.

APPLICATION EXAMPLE A

100 Parts of polyamide 6 fabric are entered into a dyebath at 40° consisting of
2000 parts of water,
1.0 part of a weakly cation-active levelling agent having affinity to the dye (on the basis of the reaction product of 1 mole N-aminopropyl-$C_{22}$ fatty acid amide and 105 moles ethylene oxide), and
1.5 parts of the dyestuff of Example 1,
the pH of which has been adjusted at 5 by adding 1–2 parts of a 40% by weight acetic acid solution. After 10 minutes at 40°, the dyebath is heated to 98° whereby the temperature is raised by steps of 1° each minute, and is kept at boiling temperature for 45–60 minutes. Subsequently, the dyebath is cooled to 70° within 15 minutes. The dyed substrate is removed from the liquor and is rinsed with warm and then cold water and dried. A red polyamide dyeing is obtained which shows good light and wet fastness properties.

APPLICATION EXAMPLE B

100 Parts of polyamide 6.6 fabric are entered into a dyebath at 40° consisting of
2000 parts of water,
1.0 part of a weakly cation-active levelling agent having affinity to the dye (of the same composition as set forth in Application Example A), and
1.5 parts of the dyestuff of Example 1,
the pH of which has been adjusted at 5.5 by adding 1–2 parts of a 40% by weight acetic acid solution. After 10 minutes at 40°, the dyebath is heated to 120° whereby the temperature is raised by steps of 1.5° each minute, and is kept at 120° for 15–25 minutes. Subsequently, the dyebath is cooled to 70° within 25 minutes. The dyed substrate is removed from the dyebath and rinsed with warm and cold water and dried. The resulting red polyamide dyeing exhibits good levelness and good light and wet fastness properties.

APPLICATION EXAMPLE C

100 Parts of polyamide 6 fabric are padded on the foulard with a liquor at 50° consisting of
40 parts of the dyestuff of Example 1,
100 parts of urea,
20 parts of a non-ionic solubilising agent (based on butyl diglycol),
15–20 parts of acetic acid (to adjust the pH of the liquor at 4)
10 parts of a weakly cation-active levelling agent having affinity to the dye (of the same composition as described in Application Example A), and
815–810 parts of water
to result a total of 1000 parts of padding liquor, and a squeezing affect of 30% by weight is achieved.

The thus impregnated fabric is rolled up and kept for fixation in a steaming chamber under the conditions of saturated steam at 85°–98° during 3–6 hours. Subsequently, the dyeing is rinsed with warm and then cold water and dried. A red polyamide dyeing is obtained which shows good levelness and good light and wet fastness properties.

APPLICATION EXAMPLE D

100 Parts of wool fabric are entered into a dyebath at 40° consisting of
4000 parts of water,
1.0 part of a levelling agent having weak affinity to the dye (which is amphoteric and based on the ammonium salt of a sulphated ethoxylated $C_{18-22}$ fatty acid amide), and
1.0 part of the dyestuff of Example 1, the pH of which has been adjusted at 5 by adding 4 parts of sodium acetate and 2 parts of acetic acid. After 10 minutes at 40° the dyebath is heated to 98° whereby raising the temperature by steps of 1° per minute, and kept at boiling temperature for 40–60 minutes. Subsequently, the dyebath is cooled to 70° within 20 minutes. The dyed substrate is removed from the dyebath and is rinsed with warm and then cold water and dried. A red wool dyeing is obtained which exhibits good light and wet fastness properties.

Similarly, the dyestuffs of Examples 2 to 62 or a mixture of the exemplified dyestuffs may be employed to dye synthetic polyamide or wool in accordance with the methods described in Application Examples A to D.

What is claimed is:

1. A compound of the formula

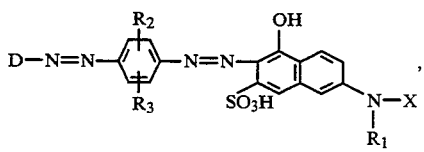

or a salt thereof each cation of which is independently a non-chromophoric cation, or a mixture of such compounds or salts; wherein
D is

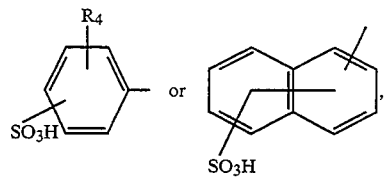

wherein $R_4$ is hydrogen, $C_{1-4}$alkyl, $C_{1-4}$alkoxy or halo,
$R_1$ is hydrogen, $C_{1-4}$alkyl or $C_{2-4}$hydroxyalkyl,
$R_2$ is hydrogen, $C_{1-4}$alkyl, $C_{1-4}$alkoxy, ($C_{1-4}$alkyl)carbonylamino, ($C_{1-4}$alkoxy)carbonylamino or —NHCONH$_2$,
$R_3$ is hydrogen, halo, $C_{1-4}$alkyl or $C_{1-4}$alkoxy, and
X is

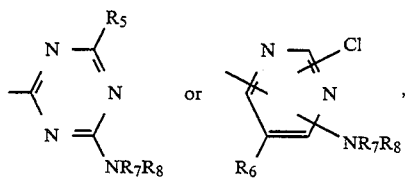

wherein
$R_5$ is chloro, hydroxy or —NHCN,
$R_6$ is hydrogen, chloro or cyano,
$R_7$ is hydrogen; $C_{1-12}$alkyl; $C_{2-8}$alkyl monosubstituted or disubstituted by hydroxy; phenyl; phenyl($C_{1-4}$alkyl) or cyclohexyl, and
$R_8$ is $C_{4-20}$alkyl; $C_{4-20}$alkyl monosubstituted or disubstituted by hydroxy; $C_{4-20}$alkyl monosubstituted by halo, phenyl, carboxy or $C_{1-12}$alkoxy; —A—O—$C_{1-12}$alkyl; phenyl; phenyl substituted by one to three substituents selected from halo, $C_{1-16}$alkyl, $C_{2-6}$hydroxyalkyl, $C_{1-6}$alkoxy, phenoxy and acetamido; phenyl($C_{1-3}$alkyl); phenyl($C_{1-3}$alkyl) the phenyl ring of which is substituted by one to three substituents selected from halo, $C_{1-16}$alkyl, $C_{2-6}$hydroxyalkyl, $C_{1-6}$alkoxy, phenoxy and acetamido; cyclohexyl or cyclohexyl substituted by one to three $C_{1-4}$alkyl groups, wherein A is linear or branched $C_{2-3}$alkylene, with the proviso that $R_7$ and $R_8$ together contain at least 8 carbon atoms, or
—NR$_7$R$_8$ is

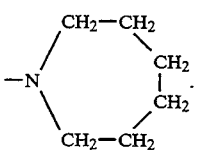

2. A compound according to claim 1, or a salt thereof each cation of which is independently a non-chromophoric cation.

3. A compound according to claim 2, or a salt thereof each cation of which is independently lithium, sodium, potassium, ammonium, methylammonium, dimethylammonium, trimethylammonium, tetramethylammonium, triethylammonium, ethanolammonium, diethanolammonium or triethanolammonium.

4. A compound according to claim 3, or a sodium salt thereof.

5. A compound according to claim 3, or a salt thereof each cation of which is independently lithium, sodium, potassium, ammonium, methylammonium, dimethylammonium, trimethylammonium, tetramethylammonium, triethylammonium, ethanolammonium, diethanolammonium or triethanolammonium, wherein each hydroxy group of each hydroxy-substituted alkyl group attached to a nitrogen atom is in other than the 1-position,
   the hydroxy groups of each alkyl group disubstituted by hydroxy are attached to different carbon atoms that are not adjacent to each other,
   the alkoxy group of each alkoxyalkyl group attached to a nitrogen atom is in other than the 1-position, and
   each halo is independently fluoro, chloro or bromo.

6. A compound according to claim 2, or a salt thereof each cation of which is independently a non-chromophoric cation, wherein D is

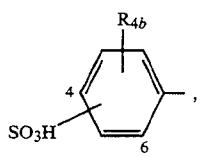

wherein $R_{4b}$ is hydrogen or methyl.

7. A compound according to claim 2, or a salt thereof each cation of which is independently a non-chromophoric cation, wherein $R_2$ is hydrogen, methyl methoxy, acetamido, ($C_{1-2}$alkoxy)carbonylamino or —NHCONH$_2$, and
   $R_3$ is hydrogen, methyl or methoxy.

8. A compound according to claim 2, or a salt thereof each cation of which is independently a non-chromophoric cation, wherein X is

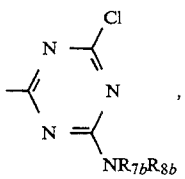

wherein
   $R_{7b}$ is hydrogen; methyl; $C_{2-4}$alkyl monosubstituted or disubstituted by hydroxy; or phenyl, and
   $R_{8b}$ is $C_{8-14}$alkyl; phenyl monosubstituted by $C_{8-14}$alkyl or phenoxy; phenyl substituted by three $C_{1-2}$alkyl groups; or cyclohexyl substituted by one to three methyl groups.

9. A compound according to claim 2, or a salt thereof each cation of which is independently a non-chromophoric cation, wherein $R_1$ is hydrogen.

10. A compound according to claim 2, or a salt thereof each cation of which is independently a non-chromophoric cation, wherein
   $R_6$ is chloro or cyano, and
   $R_8$ is $C_{4-20}$alkyl; $C_{4-20}$alkyl monosubstituted or disubstituted by hydroxy; $C_{4-20}$alkyl monosubstituted by halo, phenyl, carboxy or $C_{1-4}$alkoxy; —A—O—$C_{2-12}$alkyl; phenyl; phenyl substituted by one to three substituents selected from halo, $C_{1-14}$alkyl, $C_{2-6}$hydroxyalkyl, $C_{1-6}$alkoxy, phenoxy and acetamido; phenyl($C_{1-3}$alkyl); phenyl($C_{1-3}$alkyl) the phenyl ring of which is substituted by one to three substituents selected from halo, $C_{1-14}$alkyl, $C_{2-6}$hydroxyalkyl, $C_{1-6}$alkoxy, phenoxy and acetamido; cyclohexyl or cyclohexyl substituted by one to three $C_{1-4}$alkyl groups, wherein A is linear or branched $C_{2-3}$alkylene.

11. A compound according to claim 2, or a salt thereof each cation of which is independently a non-chromophoric cation, wherein $R_7$ is hydrogen; $C_{1-12}$alkyl; $C_{2-8}$alkyl monosubstituted or disubstituted by hydroxy; phenyl($C_{1-4}$alkyl) or cyclohexyl, and
   $R_8$ is $C_{4-20}$alkyl; $C_{4-20}$alkyl monosubstituted or disubstituted by hydroxy; $C_{4-20}$alkyl monosubstituted by halo, phenyl, carboxy or $C_{1-12}$alkoxy; —A—O—$C_{1-12}$alkyl; phenyl($C_{1-3}$alkyl); phenyl($C_{1-3}$alkyl) the phenyl ring of which is substituted by one to three substituents selected from halo, $C_{1-16}$alkyl, $C_{2-6}$hydroxyalkyl, $C_{1-6}$alkoxy, phenoxy and acetamido; cyclohexyl or cyclohexyl substituted by one to three $C_{1-4}$alkyl groups, wherein A is linear or branched $C_{2-3}$alkylene, with the proviso that $R_7$ and $R_8$ together contain at least 8 carbon atoms, or
   —NR$_7$R$_8$ is

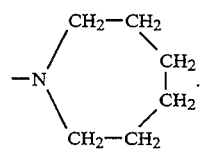

12. A compound according to claim 1 having the formula

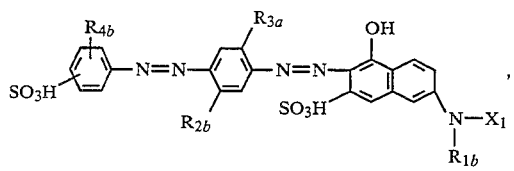

or a salt thereof each cation of which is independently a non-chromophoric cation, or a mixture of such compounds or salts, wherein
   $R_{1b}$ is hydrogen or methyl,
   $R_{2b}$ is hydrogen, methyl, acetamido or —NHCONH$_2$,
   $R_{3a}$ is hydrogen, methyl or methoxy,
   $R_{4b}$ is hydrogen or methyl,
   $X_1$ is

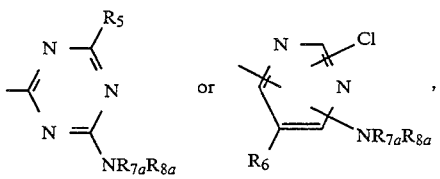

wherein
   $R_5$ is chloro, hydroxy or —NHCN,
   $R_6$ is hydrogen, chloro or cyano,
   $R_{7a}$ is hydrogen; $C_{1-4}$alkyl; $C_{2-4}$alkyl monosubstituted or disubstituted by hydroxy; or phenyl, and
   $R_{8a}$ is $C_{4-14}$alkyl; phenyl($C_{4-14}$alkyl); —A$_1$—O—$C_{6-12}$alkyl; phenyl substituted by two or three C$_{1-2}$alkyl groups; phenyl monosubstituted by C$_{6-16}$alkyl or phenoxy; phenyl(C$_{1-2}$alkyl); or phenyl(C$_{1-2}$alkyl) the phenyl ring of which is monosubstituted by C$_{6-14}$alkyl; or cyclohexyl substituted by one to three methyl groups, wherein A$_1$ is linear C$_{2-3}$alkylene, with the proviso that R$_{7a}$ and R$_{8a}$ together contain at least 8 carbon atoms.

13. A compound according to claim 12, or a salt thereof each cation of which is independently a non-chromophoric cation.

14. A compound according to claim 13, or a salt thereof each cation of which is independently a non-chromophoric cation, wherein R$_{4b}$ is hydrogen or 2-methyl, and the —SO$_3$H group is in the 4- or 5-position of R$_{4b}$-bearing ring.

15. A compound according to claim 13, or a salt thereof each cation of which is independently a non-chromophoric cation, wherein R$_{1b}$ is hydrogen.

16. A compound according to claim 15, or a salt thereof each cation of which is independently a non-chromophoric cation, wherein X$_1$ is

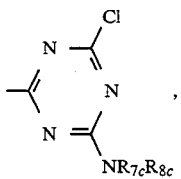

wherein

R$_{7c}$ is hydrogen, methyl, C$_{2-4}$alkyl monosubstituted by hydroxy in other than the 1-position or C$_{3-4}$alkyl disubstituted by hydroxy, with the proviso that neither hydroxy group is in the 1-position and the two hydroxy groups are not attached to the same or adjacent carbon atoms, and R$_{8c}$ is C$_{10-14}$alkyl or phenyl monosubstituted by C$_{10-14}$alkyl or phenoxy.

17. A compound according to claim 16, or a salt thereof each cation of which is independently a non-chromophoric cation, wherein R$_{7c}$ is hydrogen.

18. A compound according to claim 16, or a salt thereof each cation of which is independently a non-chromophoric cation, wherein R$_{2b}$ is hydrogen, and R$_{3a}$ is hydrogen.

19. The compound according to claim 18 having the formula

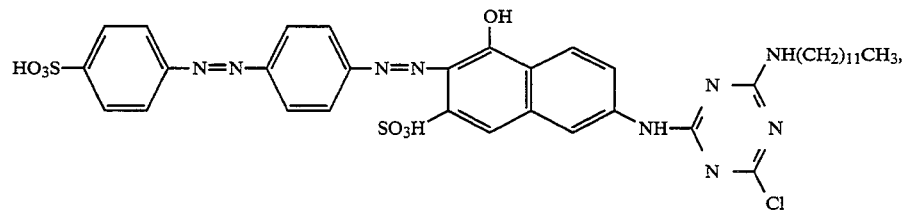

or a salt thereof each cation of which is independently a non-chromophoric cation.

20. The salt according to claim 19 having the formula

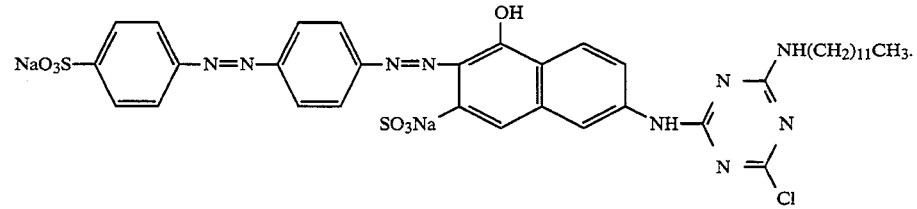

21. A process for dyeing or printing an organic substrate dyeable with anionic dyes comprising applying to an organic substrate dyeable with anionic dyes a compound, salt or mixture according to claim 1.

22. A process according to claim 21 wherein the substrate is a fiber material comprising natural or synthetic polyamide.